US012721261B2

(12) United States Patent
Swan et al.

(10) Patent No.: US 12,721,261 B2
(45) Date of Patent: Sep. 1, 2026

(54) MOWER SIDE DISCHARGE CHUTE ASSEMBLY

(71) Applicant: DEERE & COMPANY, Moline, IL (US)

(72) Inventors: Allen F. Swan, Beaver Dam, WI (US); Robert S. Goes, Beaver Dam, WI (US); Matthew J. Riehbrandt, Brownsville, WI (US)

(73) Assignee: DEERE & COMPANY, Moline, IL (US)

( * ) Notice: Subject to any disclaimer, the term of this patent is extended or adjusted under 35 U.S.C. 154(b) by 572 days.

(21) Appl. No.: 18/347,622

(22) Filed: Jul. 6, 2023

(65) Prior Publication Data

US 2025/0008871 A1 Jan. 9, 2025

(51) Int. Cl.
*A01D 34/71* (2006.01)
*A01D 34/66* (2006.01)
*A01D 101/00* (2006.01)

(52) U.S. Cl.
CPC .............. *A01D 34/71* (2013.01); *A01D 34/66* (2013.01); *A01D 2101/00* (2013.01)

(58) Field of Classification Search
CPC ..... Y10S 56/20; A01D 2101/00; A01D 34/81; A01D 34/667; A01D 34/71; A01D 43/063; A01D 43/0636
See application file for complete search history.

(56) References Cited

U.S. PATENT DOCUMENTS 3,503,194 A 3/1970 Mikelis
3,797,214 A * 3/1974 Erdman ................. A01D 34/71 56/320.2
5,398,491 A * 3/1995 Hartley .................. A01D 34/71 56/320.2
5,884,466 A * 3/1999 Willmering ............ A01D 34/81 56/320.1
5,913,804 A * 6/1999 Benway ................. A01D 34/71 56/320.2
5,992,135 A * 11/1999 Benway ................. A01D 34/71 56/200
6,874,309 B1 * 4/2005 Bellis, Jr. ............. A01D 42/005 56/320.2

(Continued)

FOREIGN PATENT DOCUMENTS

EP 2105046 A1 * 9/2009 ........... A01D 34/828
EP 3266298 A1 1/2018

OTHER PUBLICATIONS

Great Britain Examination Report issued in application No. GB2406368.7 dated Mar. 26, 2025, 04 pages.

(Continued)

*Primary Examiner* — Adam J Behrens

(57) ABSTRACT

A mower side discharge chute assembly includes an outer deflector chute pivotably mounted to a mower deck, an inner discharge chute pivotably mounted to the mower deck under the outer deflector chute, and a liner attached to the inner discharge chute and having a lower density than the outer deflector chute. A hinge with a torsion spring independently biases the outer deflector chute and the inner discharge chute from a raised position to an outwardly extending position over a side discharge opening through a top of the mower deck and a skirt on a side of the mower deck.

10 Claims, 3 Drawing Sheets

(56) References Cited

U.S. PATENT DOCUMENTS 6,971,224 B1 * 12/2005 Hancock ................ A01D 34/71 56/255
6,986,240 B2 * 1/2006 Kallevig ................ A01D 34/82 56/200
7,328,566 B2 * 2/2008 Kallevig ................ A01D 34/82 56/320.2
7,624,562 B2 * 12/2009 Kallevig ................ A01D 34/71 56/320.2
7,726,110 B2 * 6/2010 Nicholson ............ A01D 75/185 56/320.2
8,104,255 B1 * 1/2012 Hurst ..................... A01D 34/71 56/220
8,539,745 B2 * 9/2013 Schmidt ............. A01D 34/6806 56/320.2
10,791,672 B2 * 10/2020 Berglund ............... A01D 34/71
2004/0231311 A1 * 11/2004 Kallevig ................ A01D 34/82 56/320.2
2008/0047247 A1 * 2/2008 Nicholson ............ A01D 75/185 56/194
2008/0134654 A1 * 6/2008 Kohler ................... A01D 34/71 56/320.2
2009/0031689 A1 * 2/2009 Nicholson .............. A01D 34/71 56/320.2
2009/0301050 A1 * 12/2009 Kohler ................... A01D 34/71 56/320.2
2013/0139485 A1 * 6/2013 Wadzinski ......... A01D 43/0636 56/320.2
2017/0202140 A1 * 7/2017 Lopez .................... A01D 34/81
2018/0007829 A1 * 1/2018 Lopez .................. A01D 43/063
2019/0059224 A1 * 2/2019 Swan ..................... A01D 43/06
2019/0075723 A1 * 3/2019 Spitz ...................... A01D 34/71
2022/0386525 A1 12/2022 Geary

OTHER PUBLICATIONS

Chute Moldings-Custom Chute Molds, pp. 107-112 [online], [retrieved on May 24, 2023]. Retrieved from the Internet <URL: https://www.ebcoinc.com/chute-moldings>.

Great Britain Combined Search and Examination Report issued in application No. GB2406368.7 dated Oct. 14, 2024, 05 pages.

* cited by examiner 100
102
104
106
108
110
112
114
116
118

MOWER SIDE DISCHARGE CHUTE ASSEMBLY

FIELD OF THE INVENTION

This invention relates generally to rotary mower decks carried by tractors or other grass mowing machines. More specifically, the invention relates to a mower side discharge chute assembly.

BACKGROUND OF THE INVENTION

Tractors, utility vehicles or zero turn mowers used for lawn care may carry a mower deck covering two or more rotary cutting blades on the lower ends of vertically oriented spindles. A mower deck may be attached to the vehicle with mechanical linkages that allow the deck to be carried at a range of different cutting heights, and raised or lowered between each height. The blade spindles may be rotated by electric motors, or one or more belts and pulleys above the top surface of the deck, which may be driven by a belt and/or power take off shaft connected to the engine or other power source.

The mower deck may include a side discharge opening for grass clippings to exit through the skirt on the side of the mower deck. The side discharge opening also may include an opening through the top surface of the mower deck where a grass collection system may be mounted for directing clippings rearwardly and upwardly to a hopper or bag.

In the past, mower side discharge chute assemblies have been mounted adjacent the side discharge opening to help stop projectiles struck by the rotary cutting blades, or deflect them to the ground. Most side discharge chute assemblies were plastic flaps or metal plates, attached by hinges to the mower deck. Side discharge chute assemblies extend out and over the side discharge opening and direct the flow of objects down at a safe angle.

Testing procedures for side discharge chutes have included injecting steel balls or nails under the mower deck and determining the height and angle that these objects are discharged. To prevent projectile speeds being too high, ANSI requirements for allowable blade tip speeds is up to 19000 feet per minute.

Many operators mow at or near maximum blade tip speeds to improve grass cutting performance, provide even grass clipping dispersal, and allow clippings to exit the deck with limited re-cutting. At lower speeds, grass clippings may build up or clump under the deck, interfere with mowing incoming grass, and block air flow under the mower deck.

There is a need for a mower side discharge chute assembly that allows mowing at high blade tip speeds while reducing speed and angle of object struck by mower blades. There is a need for a mower side discharge chute assembly that is safe and effective, low cost, and helps improve grass cutting performance.

SUMMARY OF THE INVENTION

A mower side discharge chute assembly includes an outer deflector chute and an inner discharge chute. Each chute has a first end pivotably mounted to a mower deck and extends outwardly over a side discharge opening in a mowing position. A liner is attached to a second end of the inner discharge chute and extends further outwardly over the side discharge opening in a mowing position. The liner has a lower density than the outer deflector chute.

DESCRIPTION OF THE PREFERRED EMBODIMENT

Figure 1:
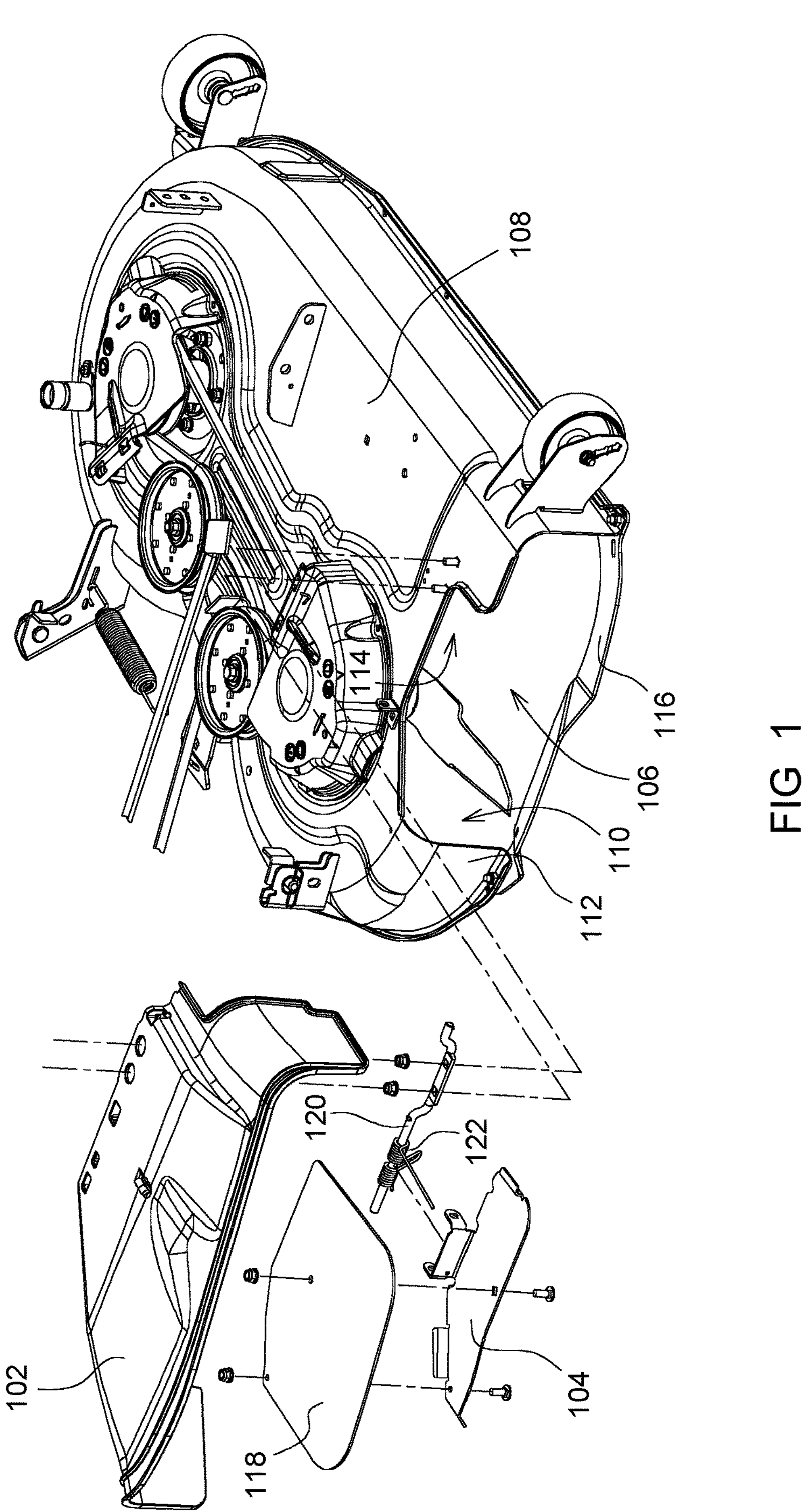
FIG. 1 is an exploded top perspective view of a mower side discharge chute assembly according to a first embodiment of the invention.
Figure 2:
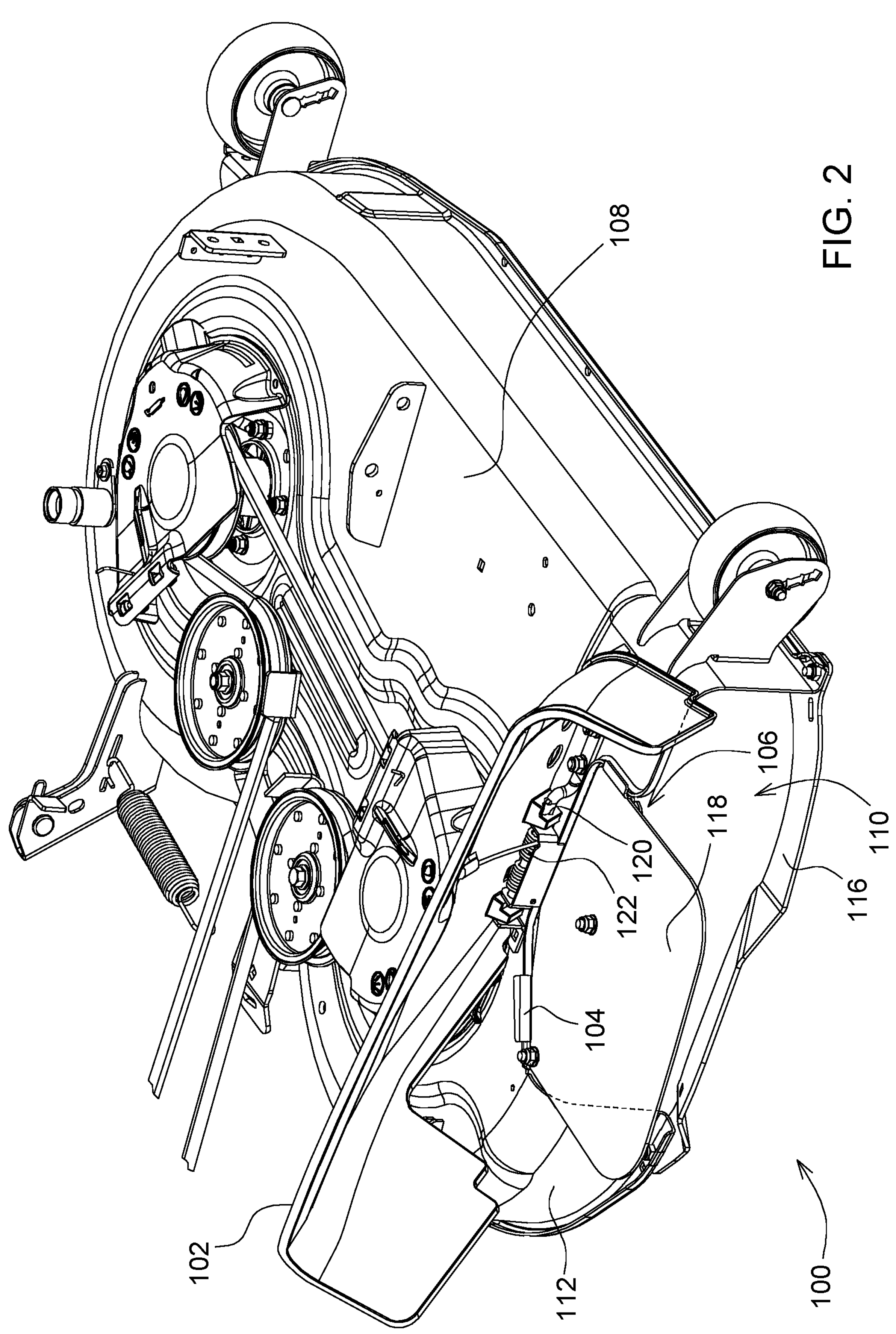
FIG. 2 is a top perspective view of a mower side discharge chute assembly with the outer deflector chute in a raised position according to a first embodiment of the invention.
Figure 3:
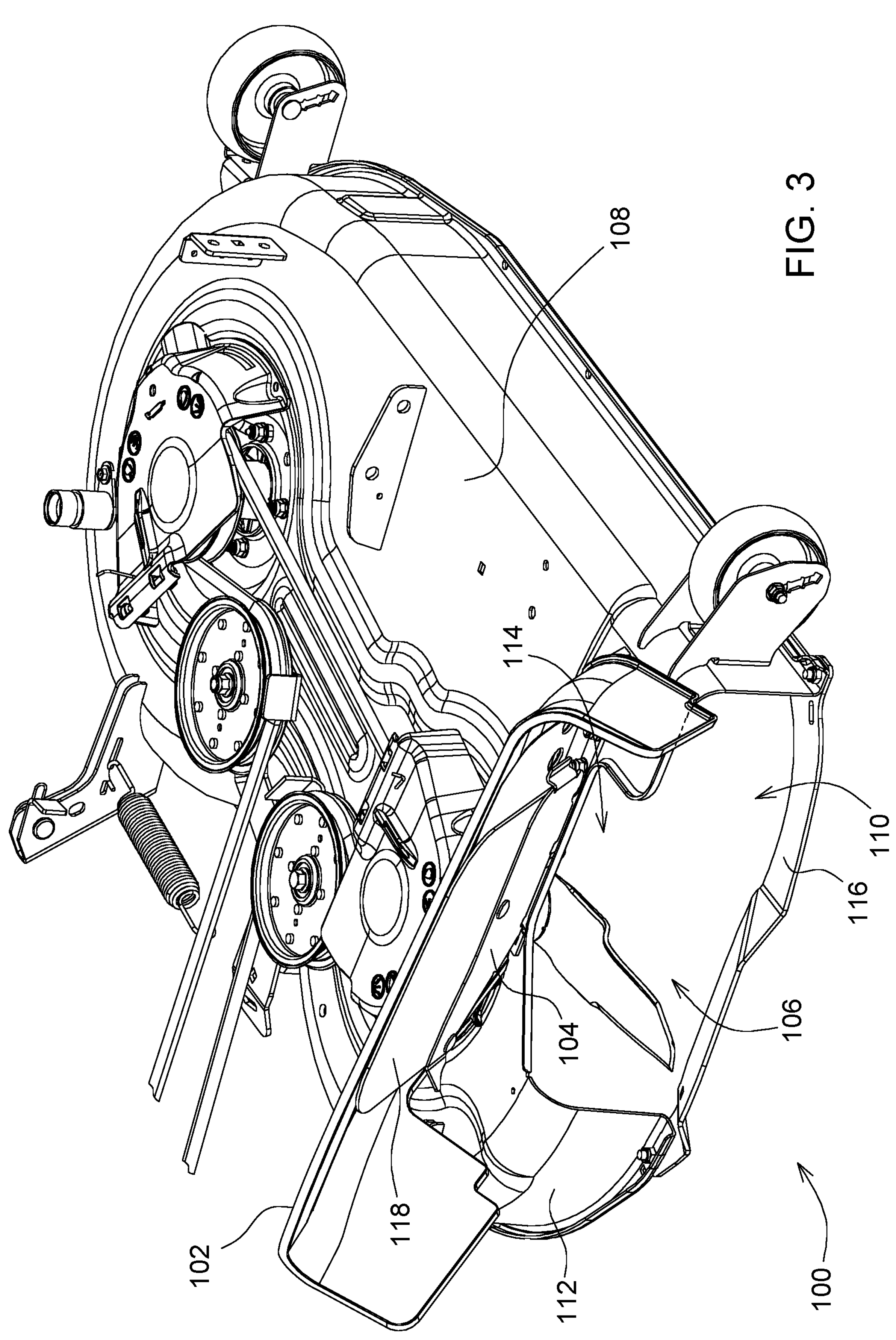
FIG. 3 is a perspective view of a mower side discharge chute assembly with the outer deflector chute and inner discharge chute raised according to a first embodiment of the invention.

In one embodiment, mower side discharge chute assembly 100 may include outer deflector chute 102 and inner discharge chute 104. A first or inward end of outer deflector chute 102, and a first or inward end of inner discharge chute 104, each may be pivotably mounted over side discharge opening 106 of mower deck 108. Side discharge opening 106 may include opening 110 through skirt 112 on the right side of the mower deck and opening 114 through the top horizontal surface of the mower deck. Toe guard 116 may be secured to the underside of skirt 112 between the front and back of opening 110.

In one embodiment, mower side discharge chute assembly 100 may include inner discharge chute 104 with liner 118 attached to a second or outward end thereof. Liner 118 may have lower density than outer deflector chute 102 which is typically polypropylene. For example, the polypropylene outer deflector chute 102 may have a density in the range of about 850 to 920 kg/m$^3$, and liner 118 may have a density in the range of about 100 to 800 kg/m$^3$.

In one embodiment, mower side discharge chute assembly 100 may include liner 118 attached to a second or outward end of inner discharge chute 104 with threaded fasteners, rivets or adhesive. Liner 108 may have greater surface area than inner discharge chute 104, but smaller surface area than outer deflector chute 102.

In one embodiment, mower side discharge chute assembly 100 may include outer deflector chute 102 and inner discharge chute 104, the inward end of each is pivotably mounted with hinge 120 adjacent opening 114 in the top of mower deck 108. Outer deflector chute 102 and inner discharge chute 104 each may be independently pivotable on hinge 120 between a lowered side discharge position, and a raised position for grass collection. In the raised position, a grass collection system (not shown) may be mounted over opening 114 through the top of the mower deck, and may extend upwardly and rearwardly to a hopper or bag. Hinge 120 may include torsion spring 122 which may bias outer deflector chute 102 and inner discharge chute 104 downward toward the lowered side discharge position. In the lowered side discharge position, both outer deflector chute 102 and inner discharge chute 104 may extend outwardly and generally horizontally over side discharge opening 106 including opening 114 through the top of the mower deck and opening 110 through the skirt on the side of the mower deck. Inner discharge chute 104 may have stops that engage the deck to stop pivoting the inner discharge chute at horizontal position.

Having described the preferred embodiment, it will become apparent that various modifications can be made without departing from the scope of the invention as defined in the accompanying claims.

The invention claimed is:

1. A mower side discharge chute assembly, comprising:

an outer deflector chute and an inner discharge chute, each chute having a first end pivotably mounted to a mower deck on the same axis and extending outwardly over a side discharge opening in a mowing position; and a liner attached to a second end of the inner discharge chute and extending further outwardly over the side discharge opening in a mowing position, the liner between the inner discharge chute and the outer deflector chute.

2. The mower side discharge chute assembly of claim 1 wherein the liner has a lower density than the outer deflector chute.

3. The mower side discharge chute assembly of claim 1 wherein the side discharge opening includes an opening through a top surface and a side skirt of the mower deck.

4. The mower side discharge chute assembly of claim 1 further comprising a torsion spring biasing the outer deflector chute and the inner discharge chute downward to a mowing position.

5. A mower side discharge chute assembly, comprising:

an outer deflector chute and an inner discharge chute, each chute being independently pivotable on the same axis between a raised position for mounting a grass collection system and an outwardly extended position over a side discharge opening of a mower deck; and a liner attached to the inner discharge chute, the liner between the inner discharge chute and the outer deflector chute and having a surface area that is greater than the inner discharge chute and less than the outer deflector chute.

6. The mower side discharge chute assembly of claim 5 wherein the side discharge opening is through a side skirt and a top surface of the mower deck.

7. The mower side discharge chute assembly of claim 5 wherein the liner is lower density material than the outer deflector chute.

8. The mower side discharge chute assembly of claim 5 wherein the inner discharge chute has stops that abut the mower deck to hold it at a horizontal mowing position.

9. A mower side discharge chute assembly, comprising:

an outer deflector chute pivotably mounted to a mower deck;

an inner discharge chute pivotably mounted to the mower deck under the outer deflector chute, the outer deflector chute and inner deflector chute pivotable with respect to the mower deck about the same axis;

a liner attached to the inner discharge chute between the inner discharge chute and outer deflector chute and having a lower density than the outer deflector chute; and a hinge with a torsion spring independently biasing the outer deflector chute and the inner discharge chute from a raised position to an outwardly extending position over a side discharge opening through a top of the mower deck and a skirt on a side of the mower deck.

10. The mower side discharge chute assembly of claim 9 wherein the liner has a larger surface area than the inner discharge chute.

* * * * *